(No Model.)
W. S. SPEER.
TONGUE SUPPORT.
No. 425,708. Patented Apr. 15, 1890.
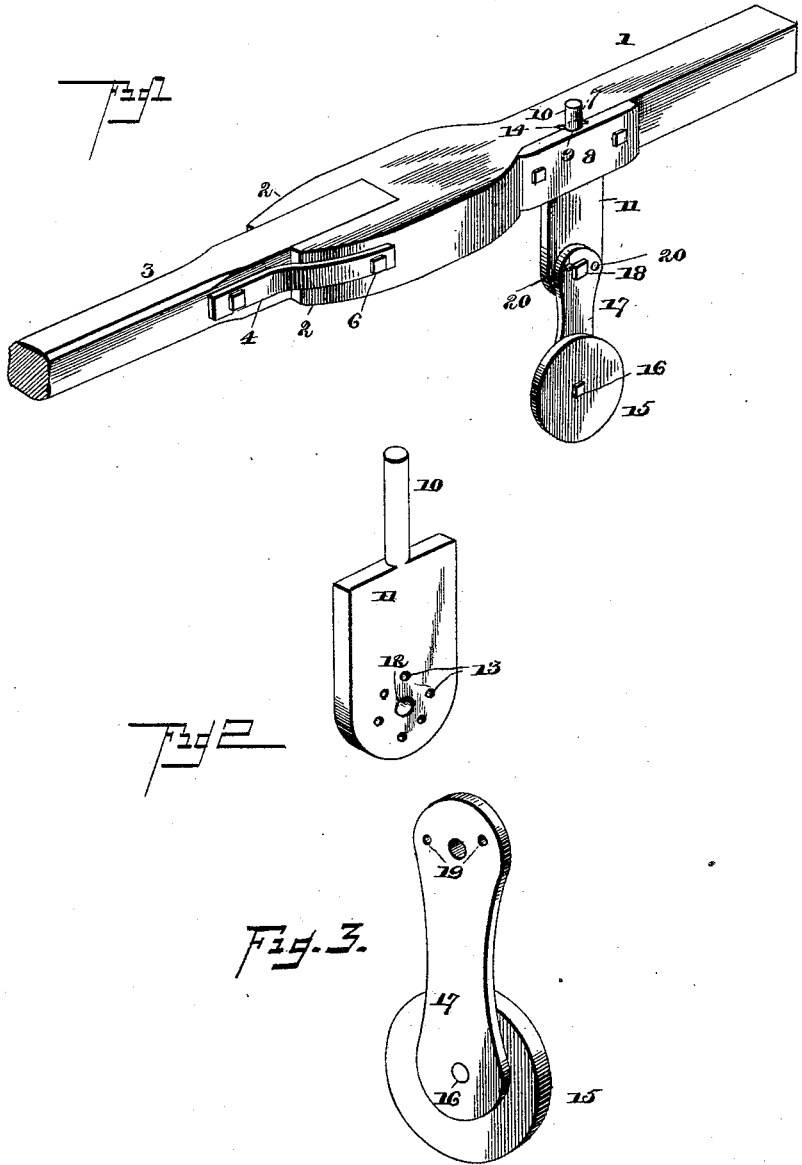
Witnesses:
John Smirie
W. S. Duvall
Inventor
W. S. Speer
By his Attorneys
C A Snow & Co

UNITED STATES PATENT OFFICE.

WILLIAM SHERMAN SPEER, OF WYACONDA, MISSOURI.

TONGUE-SUPPORT.

SPECIFICATION forming part of Letters Patent No. 425,708, dated April 15, 1890.

Application filed December 17, 1889. Serial No. 334,095. (No model.)

*To all whom it may concern:*

Be it known that I, WILLIAM SHERMAN SPEER, a citizen of the United States, residing at Wyaconda, in the county of Clarke and State of Missouri, have invented a new and useful Tongue-Support, of which the following is a specification.

This invention has relation to tongue-supports designed to be employed in heavy trucks, drays, or agricultural machinery of various kinds, the object being to remove the weight of the tongue or front end of the machine from the neck of the animal and to so construct said support as to be capable of being folded up out of contact with the ground and out of position, and also to be adjusted so as to bring its caster or wheel at a suitable distance from the tongue, thereby adjusting the same at a proper height from the ground.

With these general objects in view the invention consists in certain features of construction hereinafter specified, and particularly pointed out in the claim.

Referring to the drawings, Figure 1 is a perspective of a tongue provided with a support constructed in accordance with my invention. Fig. 2 is a detail in perspective of the support. Fig. 3 is a detail in side elevation of the inner face of the locking-plate.

Like numerals of reference indicate like parts in all the figures of the drawings.

1 represents the tongue of a truck, dray, or heavy agricultural machine, and may be of any of the ordinary constructions, and, as usual in machines of the latter class, may act as a support for the platform of the same. The forward end of the tongue is provided with opposite arms 2, projecting beyond the end of the tongue, and between said arms occurs the rear end of the draft-pole 3, which in this instance I provide with a pair of rearwardly-disposed straps 4, through which arms and the pole I form a bolt-opening 5, through which is inserted a bolt 6. If desired, however, it will be apparent that the tongue and pole may be formed integral, or, in other words, that the tongue may be continued to form the pole.

The tongue 1 at one side thereof is provided with a semicircular vertical recess 7, and over the same is bolted a plate 8, provided with a similar semicircular recess 9, registering with the recess 7, and the two combining to form a vertical bearing, in which is mounted for pivotal movement the cylindrical standard 10, which below the tongue merges into a plate 11, through the center of which is formed a bearing-opening 12, surrounded by a series of bolt-openings 13. The standard 11 is provided above the tongue with a linchpin 14, and the plate at its upper edge forms a bearing for the support of the tongue.

15 represents an ordinary caster-wheel, which is mounted upon a transverse bearing 16, projecting laterally from the lower end of an arm 17, the upper end of which is provided with a binding-bolt 18, which projects in an opposite direction and passes through the central bearing-opening 12, formed in the locking-plate. The upper end of the arm 17 is also provided with a pair of opposite bolt-openings 19, and in each of the same are mounted bolts 20, the ends of which take into an opposite pair of openings 13 of the plate 11.

By loosening the bolts 20 from their locking position it is apparent that the arm 17 may be swung out of the vertical line with the standard, the bolts 20 taking in other opposite openings 13, and thus the tongue lowered or caster swung out of position, or by a reverse movement and a swinging of the arm into line with the standard said tongue may be raised. By a provision of a support of the character described it is apparent that the caster-wheel will always be in position for rotation, no matter how rough the ground may be over which the machine or vehicle is moved, and will serve as a ready support for the parts, as heretofore enumerated.

Having described my invention, what I claim is—

The combination, with the tongue, of a vertical standard having a cylindrical upper end mounted for free rotation in said tongue, said standard terminating at its lower end in a locking-plate having a central perforation and an annular series of perforations concentric with the central perforation, the arm having a caster-wheel at its lower end, a central and two diametrically-opposite side openings at its upper end, a bearing-pin passed through the central openings of the arm and locking-plate, and opposite locking-bolts passed through the diametrically-opposite openings and similar registering perforations in the concentric annular series of openings formed in the locking-plate, substantially as specified.

In testimony that I claim the foregoing as my own I have hereto affixed my signature in presence of two witnesses.

WILLIAM SHERMAN SPEER.

Witnesses:
E. M. CHAPPELL,
C. L. CHAPPELL.